US006641083B2

(12) United States Patent
Izutsu et al.

(10) Patent No.: US 6,641,083 B2
(45) Date of Patent: Nov. 4, 2003

(54) BALLOON

(75) Inventors: Naoki Izutsu, Sagamihara (JP); Nobuyuki Yajima, Sagamihara (JP)

(73) Assignee: The Director-General of the Institute of Space and Astronautical Science, Sagamihara (JP)

( * ) Notice: Subject to any disclaimer, the term of this patent is extended or adjusted under 35 U.S.C. 154(b) by 0 days.

(21) Appl. No.: 10/061,274

(22) Filed: Feb. 4, 2002

(65) Prior Publication Data

US 2003/0052223 A1 Mar. 20, 2003

(30) Foreign Application Priority Data

Aug. 8, 2001 (JP) .................................. 2001-240870

(51) Int. Cl.[7] ............................................... B64C 1/40
(52) U.S. Cl. ............................ 244/31; 244/94; 244/29
(58) Field of Search ........................... 244/29, 30, 31, 244/32, 128, 94, 95

(56) References Cited

U.S. PATENT DOCUMENTS

| 345,903 | A | * | 7/1886 | Papst | 171/54 |
|---|---|---|---|---|---|
| 1,035,560 | A | * | 8/1912 | Erdmann | 244/98 |
| 2,362,966 | A | * | 11/1944 | Bertsch | 244/98 |
| 3,268,184 | A | * | 8/1966 | Biggar et al. | 169/26 |
| 3,456,903 | A | | 7/1969 | Papst et al. | |
| 3,807,384 | A | * | 4/1974 | Schach et al. | 126/680 |
| 4,012,016 | A | * | 3/1977 | Davenport | 244/125 |
| 4,032,085 | A | * | 6/1977 | Papst | 244/128 |
| 4,032,086 | A | * | 6/1977 | Cooke | 244/125 |
| 4,394,998 | A | * | 7/1983 | Taillet et al. | 244/158 R |
| 4,432,513 | A | * | 2/1984 | Yost | 24/443 |
| 4,993,664 | A | * | 2/1991 | Kneeland | 244/94 |
| 4,999,236 | A | | 3/1991 | McCullough, Jr. et al. | |
| 6,224,016 | B1 | * | 5/2001 | Lee et al. | 136/245 |
| 6,425,552 | B1 | * | 7/2002 | Lee et al. | 244/97 |

FOREIGN PATENT DOCUMENTS

| FR | 2 684 952 | | 6/1993 | | |
|---|---|---|---|---|---|
| FR | 002684952 | A1 | * | 6/1993 | 244/31 |

OTHER PUBLICATIONS

"Exploring Venus", "The Universe, In the Classroom", www.astrosociety.org/education/publications/tnl/02/venus2.html.*
"Topic 19 Materials, Structures, and Environmental Effects", National Aeronautics and Space Administraction, Small Business Innovation Research 1998 Program Solicitation., www.sbir.nasa.gov/SBIR/sbir98/solicitation/TOPICS/topic19.html.*
"Venus VEGA Mission Detailed Description", pp. 1–10, www.robotics.jpl.nasa.gov/tasks/aerobot/studies/vega_detail.html.*
"Reversibel Fluid Balloon Altitude Control", Jack Jones,, 1997, pp. 2–3.*
"Cross Cutting and Related Technologies: Planetary Balloons", Cutts, Jim; Nov. 1, 1998 pp. 1–16.*
Mylar Bags, Dec. 1, 1999, pp. 1–4.*
"Superpressure Balloons Reach new Heights", Parks, Elizabeth, Apr. 6, 2000, pp. 48,50.*
"report on the Analysis, Design, Construction, and Testing of a Prototype Mars Micro Balloon Probe", Zubrin, Rober et al.*

(List continued on next page.)

*Primary Examiner*—Charles T. Jordan
*Assistant Examiner*—Stephen Holzen
(74) *Attorney, Agent, or Firm*—Oblon, Spivak, McClelland, Maier & Neustadt, P.C.

(57) ABSTRACT

A balloon comprising an envelope, wherein the envelope has a multilayered structure comprising a gas-impervious sheet, and a liquid absorbent sheet overlaid on the inner surface of the gas-impervious sheet.

6 Claims, 2 Drawing Sheets

OTHER PUBLICATIONS

"Aerospace sciences", "Balloons", aerospace America / Dec. 2001, p. 9.*

"Aerobot—Wikipedia", "Balloons for Planetary Exploration", v. 1, Mar. 15, 1999 pp. 1–7.*

Venus Geoscience Aerobot Balloon Envelop, http://robotics.jpl.nasa.gov/tasks/aerobot/studies/vegasenv.html, (no date), pp. 1–2.*

"Venus Geoscience Aerobot Study", Bachelder et al, American Institute of Aeronautics & Astronautics, 1999, pp. 21–33.*

A. Bachelder, et al. Venus Geoscience Aerobot Study (Vegas), American Institute of Aeronaurics & Astronautics, 1999, pp. 21–33.

* cited by examiner

BALLOON

CROSS-REFERENCE TO RELATED APPLICATIONS

This application is based upon and claims the benefit of priority from the prior Japanese Patent Application No. 2001-240870, filed Aug. 8, 2001, the entire contents of which are incorporated herein by reference.

BACKGROUND OF THE INVENTION

1. Field of the Invention

This invention relates to a balloon including a balloon for planetary exploration and a commercial hot air balloon.

2. Description of the Related Art

On a planet where an atmosphere exists, it is possible to float a balloon in the atmosphere for a long time to perform a wide range of observations, as in the case of the earth. When a probe transports the balloon to the planet, the gas for the balloon buoyancy should preferably be conveyed to the planet in a liquefied gas rather than in a gas filled in a high-pressure vessel. It is because the liquefied gas state can advantageously reduce the mass and volume of the probe launched into the space. For example, when the planet has atmospheric temperatures which are relatively high at the altitude of the balloon floating, the gas should be selected from those materials that can maintain the liquefied gas state at the ordinary temperatures and can turn into the gas state at the relatively high atmospheric temperature of the planet. Such materials can be very convenient because they can maintain the liquid state during the transport toward the planet and can turn into the gas state during the floating in the planet's atmosphere. Specifically, a capsule for containing the balloon is designed to release the balloon when the capsule plunges into the atmosphere of the planet, and then the balloon is allowed to fall through the atmosphere while suspending from a parachute. During this short time of falling, the liquefied gas should vaporize sufficiently to expand the balloon.

In the conventional method of vaporizing the liquid for the balloon buoyancy gas within such a short time, a system has been required that comprises a vessel for containing the liquid, a heat exchanger for vaporizing the liquid, and a piping system for connecting these constituent members with the balloon. For this purpose, the heat exchanger needs to have excellent efficiency. However, there is a limit in improving the efficiency of the heat exchanger. Thus, the vaporization of a large amount of liquid within a short time requires a large scale heat exchanger which has a large surface area to be in contact with the atmosphere. As a result, a reduction effect on the mass and volume of the probe, which is derived from transporting the balloon buoyancy gas in a liquid state, is minimized.

BRIEF SUMMARY OF THE INVENTION

An object of the present invention is to provide a balloon which is lighter and smaller.

According to this invention, there is provided a balloon comprising an envelope; wherein the envelope has a multi-layered structure comprising a gas-impervious sheet, and a liquid absorbent sheet overlaid on the inner surface of the gas-impervious sheet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
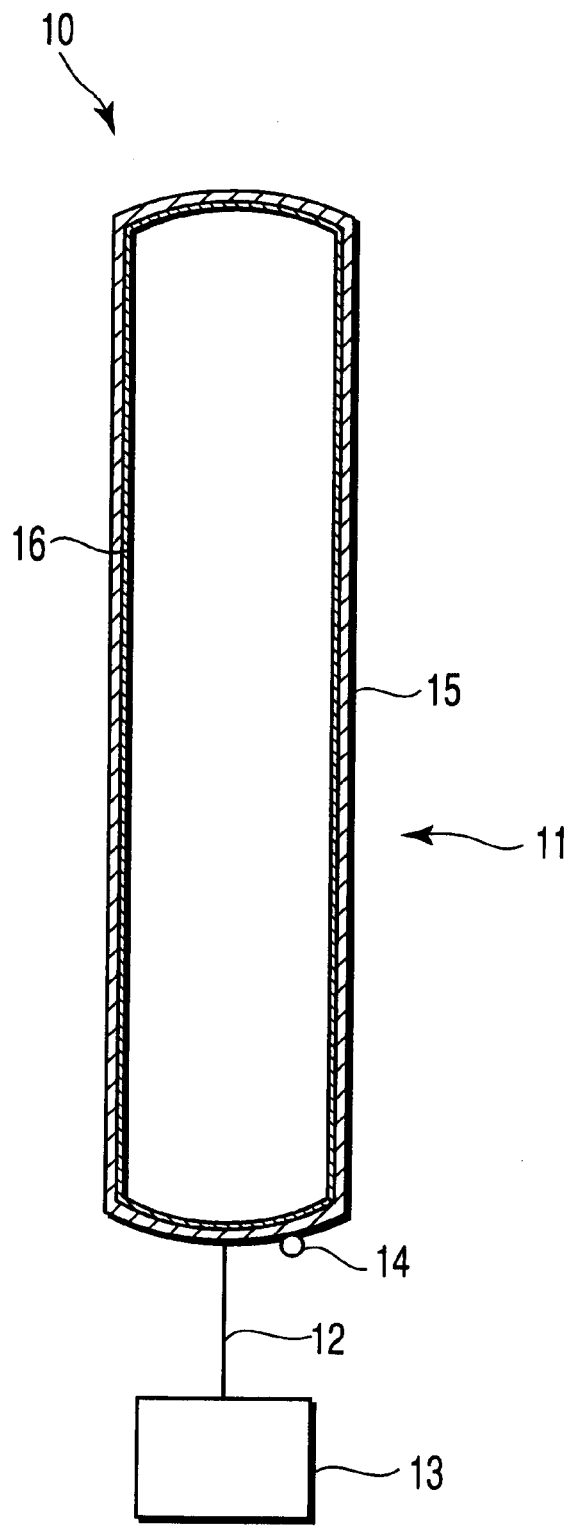
FIG. 1 is a schematic view showing one example of a balloon according to the present invention.

The present invention has been accomplished in the course of studying a method for floating a balloon over a planet such as Venus. Specifically, this method is aimed at transporting the buoyancy gas in a liquid state to Venus, and vaporizing the liquefied gas in a short time at the high temperatures of the Venusian atmosphere to expand the envelope of the balloon.

The envelope for containing the balloon buoyancy gas comprises a gas-impervious sheet. The gas impervious sheet has a liquid absorbent sheet adhered on its rear surface (inner surface). The liquid absorbent sheet is made of a film or fiber exhibiting excellent liquid absorbency. The liquid absorbent sheet can hold liquefied materials for the buoyancy gas. The liquid held and distributed throughout the liquid absorbent sheet can be vaporized to produce some degree of buoyancy in the balloon and to adjust the buoyancy produced. The liquid can vaporize either by heat exchanging between the envelope surface and the high temperature atmosphere around the envelope, or by raising the temperature inside the envelope with a heater.

The liquid absorbent sheet refers to a sheet which can hold a liquid, for example, having a weight equal to or more than 1 time, preferably 3 times, more preferably 5 times as large as the sheet's own weight. The liquid absorbent sheet can also contain a liquid, for example, having a weight of up to from 100 to 200 times as large as its own weight.

Specific examples of the water absorbent sheet can include a polymer fabric based on sodium polyacrylate. The polymer fabric has a water absorbency in which a water of weight 80 times as large as its own weight can be absorbed. Another examples of the high-water absorbent fabric can include an acrylic fiber.

The liquid absorbent sheet, which is formed of a film and the like, for the use in the present invention can hold a large quantity of liquid as described above. Thus an increased mass of the envelope can greatly be minimized to have a liquid absorbent sheet necessary to hold a predetermined quantity of a liquid. The liquid for the buoyancy gas can previously be confined within the envelope by making it held in the liquid absorbent sheet so that the envelope can be sealed from the beginning. As a result, a gas injector and any relevant piping systems are no longer required to inject the gas into the envelope. Thus the weight of the balloon system can be reduced and the structure of the balloon system can be simplified to increase the reliability of the balloon system.

The skin of the envelope has a surface area much larger than that of the large scale heat exchanger. Therefore, even if the skin does not have high heat exchange efficiency per unit area, the total skin can have high heat exchange efficiency which is as high as that of the large-scale heat exchanger. Accordingly, for a planet such as Venus whose the atmosphere has a relatively high temperature, a large quantity of heat can transfer to the liquid absorbent sheet from the high-temperature atmosphere of the planet when the envelope extends its full length to expose the surface in the atmosphere during the descent of the balloon with a parachute. This large quantity of heat can vaporize the liquid retained in the sheet within a short time to provide sufficient buoyancy to the balloon.

As described above, according to the balloon of the present invention, the liquid for the buoyancy gas can widely be distributed and retained on the inner surface of the envelope to be transported to the planet. The liquid can then vaporize using the envelope skin as a giant heat exchanger, which is in contact with the high-temperature atmosphere of the planet. Therefore, a balloon can be provided which is relatively light and small and can vaporize the liquefied buoyancy gas within a short time.

The balloon according to the present invention can also be applied to a commercial hot air balloon for floating in the earth's atmosphere. In this case, water can be retained in the liquid absorbent sheet attached to the inner surface of the envelope (balloon envelope) of the hot air balloon. The water can then vaporize to generate a water vapor which can be used as a portion of the buoyancy gas. The water can vaporize by raising the temperature inside the envelope with a heater. Since a portion of the buoyancy gas consists of the water vapor which has the molecular weight smaller than the average molecular weight of the atmosphere, it is possible to obtain a balloon which can float with an envelope relatively small and light.

EXAMPLE 1

FIG. 1 shows a schematic sectional view of a balloon for planetary exploration 10 according to the present invention.

The balloon for planetary exploration 10 comprises an envelope 11, a payload (observation device) 13 suspended via a hanging rope 12 from the envelope 11, and a pressure-adjusting valve 14 attached to the envelope 11. The pressure-adjusting valve 14 can adjust the pressure inside the envelope. The envelope 11 has a multilayered structure comprising a front gas-impervious sheet 15 constituting the envelope's skin, and a liquid absorbent sheet 16 overlaid on the inner surface of the sheet 15.

As shown in FIG. 1, the liquid absorbent sheet 16 which is made of a liquid-retainable and absorbable film or fabric is attached to the rear surface (inner surface) of the gas-impervious sheet 15. The liquid absorbent sheet 16 previously contains a widely distributed liquid which can be turned into the buoyancy gas in the atmospheric environment where the balloon 10 floats. For example, when the water vapor is used as a portion of the buoyancy gas or the buoyancy adjustment gas, a water absorbent sheet 16 which is formed of a light and thin sheet made of a liquid absorbent film or fabric can be used. The water is previously impregnated in the sheet 16.

In the balloon 10 as constructed above, during the descent of the balloon 10 with a parachute through the atmosphere of the planet such as Venus, the envelope 11 can extend its full length to expose its surface in the atmosphere, as described above. Thus, the liquid absorbed on the inner surface of the envelope 11 can vaporize within a short time to produce or adjust the buoyancy. As mentioned above, the large surface area of the main body of the envelope 11 can be utilized as a heat exchanger to transfer a large quantity of heat to the liquid absorbent sheet 16 so that the liquid can rapidly vaporize to provide sufficient buoyancy to the balloon.

The envelope 11 can be manufactured in the same manner as conventionally employed. A heat exchanger, a gas injector and relevant piping systems are no longer required. Accordingly, the present invention can easily be implemented to provide a balloon that is relatively small and light.

Assuming that the planetary exploration balloon 10 is to be floated in the atmosphere of Venus, the maximum mass of the gondola (observation device) 13 which can suspend from the balloon 10 will be determined.

As an example, the balloon 10 is assumed to float at the altitude of 35 km. At this altitude, the atmospheric pressure, atmospheric temperature and atmospheric density are 581 kPa, 180° C. and 6.74 kg/m$^3$, respectively. It is also assumed to float a cylindrical envelope 11 of a diameter of 0.34 m and a length of 16.4 m. The envelope 11 has a generally cylindrical shape which has either ends configured for a special shape. The envelope 11 has a volume of 1.484 m$^3$ and an entire surface area of 18.2 m$^2$. The gravity acceleration of Venus is assumed to be 8.77 m/s$^2$. In this example, the force is expressed in Newton (N), and the mass is expressed in kilogram (kg).

First of all, the buoyancy of the balloon 10 produced at the altitude can be calculated as follows.

$$\begin{aligned}
\text{(Buoyancy of Balloon)} &= \text{(Volume of envelope)} \times \\
&\quad \text{(Density of atmosphere)} \times \\
&\quad \text{(Gravity acceleration of Venus)} \\
&= 1.484 \times 6.74 \times 8.77 \\
&= 87.7 \text{ N}
\end{aligned}$$

Excess buoyancy can be determined by subtracting, from the value of buoyancy calculated above, the gravity force on the envelope 11 (the gravity force on the gas-impervious sheet 15+the gravity force on the water absorbent sheet 16) and the gravity force on the water vapor existing inside the envelope 11. The excess buoyancy will balance with the gravity force on the observation device 13 which can suspend from the envelope 11.

First, the gravity force on the gas-impervious sheet 15 is determined. Assuming that the thickness of 100 $\mu$m and density of 1.5 g/cm$^3$ of a heat resistive gas-impervious film is employed in the gas-impervious sheet 15, the gravity force on the gas-impervious sheet 15 can be determined as follows.

$$\begin{aligned}
\text{(Gravity force on gas-impervious sheet)} &= \text{(Density)} \times \text{(Thickness)} \times \\
&\quad \text{(Entire surface area)} \times \\
&\quad \text{(Gravity acceleration} \\
&\quad \text{of Venus)} \\
&= (1.5 \times 10^3) \times (100 \times 10^{-6}) \times \\
&\quad 18.2 \times 8.77 \\
&= 24.0 \text{ N}
\end{aligned}$$

Then, the gravity force on the water vapor inside the envelope 11 is determined. Assuming that the pressure in the envelope 11 is 15 kPa higher than the ambient atmospheric pressure, the gravity force on the water vapor necessary to produce the buoyancy of the balloon can be determined as follows.

$$\begin{aligned}
\text{(Gravity force on water vapor)} &= \text{(Volume of envelope)} \times \text{(Pressure inside the envelope)} \times \\
&\quad \text{(Gravity acceleration of Venus)}/ \\
&\quad \text{(Gas constant of water vapor)}/ \\
&\quad \text{(Temperature inside the envelope)} \\
&= 1.484 \times (581000 + 15000) \times \\
&\quad 8.77/461.4/(180 + 273.16) \\
&= 37.1 \text{ N}
\end{aligned}$$

Finally, the gravity force on the water absorbent sheet 16 is determined. The gravity force on the water vapor as determined above is equal to the gravity force on the water to be impregnated in the water absorbent sheet 16. Assuming that the water absorbing capacity of the sheet 16 is 20 kg/kg, the gravity force on the sheet 16 for absorbing the water vapor can be determined as follows.

$$\begin{aligned}
\text{(Gravity force on water absorbent sheet)} &= \text{(Gravity force on water vapor)}/ \\
&\quad \text{(Water absorbing capacity)} \\
&= 37.1/20 \\
&= 1.9 \text{ N}
\end{aligned}$$

Thus, the excess buoyancy can be determined as follows.

$$\begin{aligned}
\text{(Excess buoyancy)} &= \text{(Buoyancy of balloon)} - \text{(Gravity force on gas-impervious sheet)} - \text{(Gravity force on water absorbent sheet)} - \text{(Gravity force on water vapor)} \\
&= 87.7 - 24.0 - 1.9 - 37.1 \\
&= 24.7 \text{ N}
\end{aligned}$$

This excess buoyancy will balance with the gravity force on the observation device 13 which can suspend from the envelope 11 as described above. Therefore, the maximum mass of the observation device 13 can be determined as follows.

$$\begin{aligned}
\text{(Maximum mass of observation device)} &= 24.7/8.77 \\
&= 2.82 \text{ kg}
\end{aligned}$$

Further, the total mass of the balloon 10 to be mounted on the probe (the balloon 10 to be launched) can be determined as follows.

$$\begin{aligned}
\text{(Total mass of balloon)} &= 87.7/8.77 \\
&= 10 \text{ kg}
\end{aligned}$$

EXAMPLE 2

Figure 2:
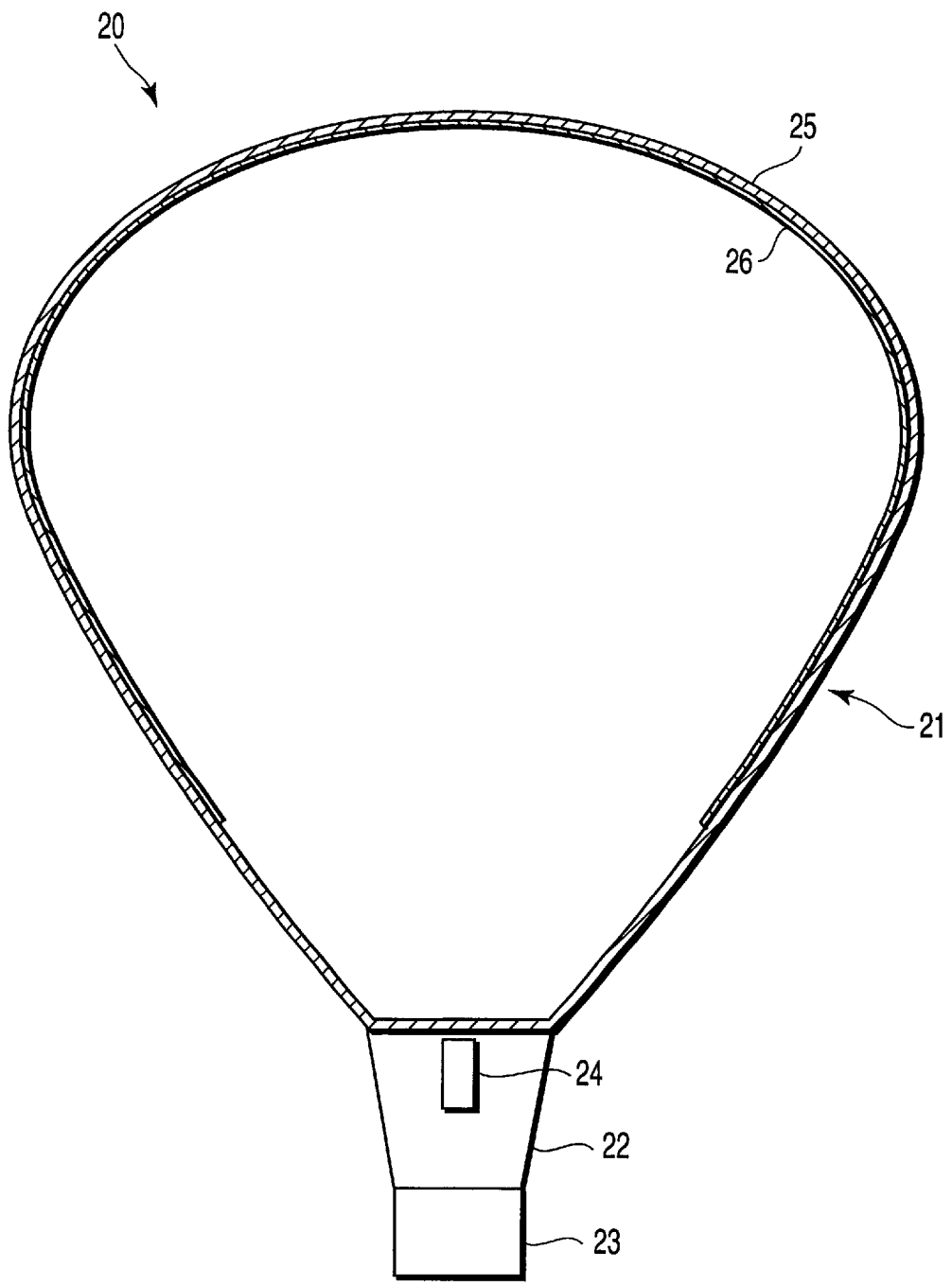
FIG. 2 is a schematic view showing another example of a balloon according to the present invention.

FIG. 2 shows a schematic sectional view of a commercial balloon 20 according to the present invention.

The commercial balloon 20 comprises an envelope (a balloon envelope) 21, a gondola 23 suspended via a hanging rope 22 from the envelope 21, and a burner 24. The envelope 21 has the same shape as in the case of the hot air balloon. The gondola 23 can carry crews. The burner 24 can heat the air or the like inside the envelope 21. The envelope 21 has a multilayered structure comprising a front gas-impervious sheet 25, and a water absorbent sheet 26 overlaid on the rear surface (inner surface) of the sheet 25. The sheet 26 is made of a water absorbent film or water absorbent fabric. Water is previously distributed and retained throughout the water absorbent sheet 26.

The heat from the burner 24 can heat the air inside the envelope 21 as well as the water retained in the water absorbent sheet 26 to evaporate it. Thus, the buoyancy gas can consist of the heated air as well as the water vapor so that the excess buoyancy per unit volume of the envelope 21 can be increased. Therefore, for the same mass of the loaded components, a smaller and lighter envelope 21 can float the balloon 20.

The surface of the envelope 21 is in contact with the atmosphere which is lower in temperature than the gases inside the envelope 21. Thus, part of water vapor which touches the inner surface of the envelope 21 can cool to liquefy to turn back into the water. The liquefied water on the inner surface of the envelope 21 can be retained again in the water absorbent sheet 26 rather than falling down along the inner surface of the envelope 21. The water retained in the sheet 26 is again heated on contact with the heated air or water vapor in the envelope 21 and vaporized. As a result, equilibrium can be established at an appropriate temperature.

Thus, it is possible to provide a hybrid hot air balloon which can use a water vapor as part of the buoyancy gas and can result in a lighter and smaller balloon.

Assuming that the hot air balloon 20 is to be floated in the atmosphere of the earth as the commercial balloon 20 shown in FIG. 2, the maximum loading capacity of the hot air balloon 20 can be calculated as follows.

As an example, the hot air balloon 20 is considered to float at the altitude of 0 m over the earth. At this altitude, the atmospheric temperature is 15° C., the atmospheric density is 1.2 kg/m$^3$ and the mass of the envelope 21 per unit area is assumed to be 0.1 kg/m$^2$. The envelope 21 has the volume of 2000 m$^3$. The gas inside the envelope 21 is heated with the burner at the temperature of 110° C. The envelope 21 can have the surface area of 768 m$^2$ when its shape is approximated as a sphere. The gravity acceleration of the Earth is assumed to be 9.8 m/s$^2$.

Two cases will be considered: the first case where the buoyancy gas is only constituted of the air, and the second case where the buoyancy gas is constituted of 100% water vapor.

First of all, the first case is considered.

The buoyancy of the balloon 20 produced at the altitude of 0 m can be calculated as follows.

$$\begin{aligned}
\text{(Buoyancy of balloon)} &= \text{(Volume of envelope)} \times \\
&\quad \text{(Density of air atmosphere)} \times \\
&\quad \text{(Gravity acceleration of Earth)} \\
&= 2000 \times 1.2 \times 9.8 \\
&= 23520 \text{ N}
\end{aligned}$$

The gravity force on the envelope 21 can be determined as follows.

$$\begin{aligned}(\text{Gravity force on envelope}) &= (\text{Mass per unit area}) \times \\ &\quad (\text{Surface area}) \times \\ &\quad (\text{Gravity acceleration of Earth}) \\ &= 0.1 \times 768 \times 9.8 \\ &= 753 \text{ N}\end{aligned}$$

The gravity force on the air inside the envelope 21 can be determined as follows.

$$\begin{aligned}(\text{Gravity force on inner air}) &= (\text{Volume of envelope}) \times \\ &\quad (\text{Density of atmosphere}) \times \\ &\quad (\text{Atmospheric atmosphere}) \times \\ &\quad (\text{Gravity acceleration of Earth})/ \\ &\quad (\text{Heating temperature}) \\ &= 2000 \times 1.2 \times (15 + 273.6) \times \\ &\quad 9.8/(110 + 273.6) \\ &= 17688 \text{ N}\end{aligned}$$

The gravity force on the other equipments (gondola, burner and gas cylinder) is assumed as follows.

$$(\text{Gravity force on equipments}) = 1960 \text{ N}$$

Thus, the excess buoyancy can be determined as follows.

$$\begin{aligned}(\text{Excess buoyancy}) &= (\text{Buoyancy of balloon}) - (\text{Gravity force on} \\ &\quad \text{envelope}) - (\text{Gravity force on inner air}) - \\ &\quad (\text{Gravity force on equipments}) \\ &= 23520 - 753 - 17688 - 1960 \\ &= 3119 \text{ N}\end{aligned}$$

This value is the maximum loading capacity of the hot air balloon 20 when the buoyancy gas is only constituted of the air.

Next, the second case is considered where the buoyancy gas is constituted of 100% water vapor. In this case, the envelope 21 in which the water absorbent sheet 26 is provided has the increased mass per unit area of 0.115 kg/m² rather than 0.1 kg/m². The calculation can be performed in the same manner as in the first case.

The buoyancy of the balloon 20 is the same as in the first case, i.e. 23520 N.

The gravity force on the envelope 21 can be determined as follows.

$$\begin{aligned}(\text{Gravity force on envelope}) &= (\text{Mass per unit area}) \times (\text{Surface area}) \times \\ &\quad (\text{Gravity acceleration of Earth}) \\ &= 0.115 \times 768 \times 9.8 \\ &= 866 \text{ N}\end{aligned}$$

The gravity force on the water vapor inside the envelope 21 can be determined as follows.

$$\begin{aligned}(\text{Gravity force on water vapor}) &= (\text{Volume of envelope}) \times \\ &\quad (\text{Density of water vapor at} \\ &\quad 110° \text{ C.}) \times (\text{Gravity acceleration} \\ &\quad \text{of Earth}) \\ &= 2000 \times 0.58 \times 9.8 \\ &= 11368 \text{ N}\end{aligned}$$

The gravity force on the other equipments (gondola, burner and gas cylinder) is assumed to be the same as in the first case, i.e. 1960 N.

Thus, the excess buoyancy can be determined as follows.

$$\begin{aligned}(\text{Excess buoyancy}) &= (\text{Buoyancy of balloon}) - \\ &\quad (\text{Gravity force on envelope}) - \\ &\quad (\text{Gravity force on water vapor}) - \\ &\quad (\text{Gravity force on equipments}) \\ &= 23520 - 866 - 11368 - 1960 \\ &= 9326 \text{ N}\end{aligned}$$

This value is the maximum loading capacity of the hot air balloon 20 when the buoyancy gas is constituted of 100% water vapor.

It can be seen that the maximum loading capacity in the second case is much larger than that in the first case where the buoyancy gas is only constituted of the air. In other words, the envelope 21 can have a volume smaller than that in the first case to realize the same maximum loading capacity as that in the first case.

In fact the buoyancy gas cannot be constituted of 100% water vapor and can actually be constituted of 50% air and 50% water vapor, for example. Therefore, the maximum loading capacity of the balloon 20 can be some values between the above two values in the first and second cases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A balloon comprising:

an envelope, wherein said envelope has a multilayered structure including a gas-impervious sheet and a liquid absorbent sheet, said liquid absorbent sheet being overlaid on an inner surface of said gas-impervious sheet, and wherein said liquid absorbent sheet is capable of containing a liquid of a weight from 1 to 200 times as large as a weight of said liquid absorbent sheet.

2. The balloon according to claim 1, wherein said liquid absorbent sheet is a water absorbent sheet.

3. The balloon according to claim 2, wherein said water absorbent sheet contains water.

4. The balloon according to claim 3, wherein said water absorbent sheet is formed of a polymer fiber.

5. A balloon for planetary exploration, said balloon comprising:

an envelope, and a payload, wherein said envelope has a multilayered structure including a first sheet, which is gas-impervious sheet, and a second sheet containing water, said second sheet being overlaid on an inner surface of said first sheet, and wherein said second sheet is capable of containing water of a weight from 1 to 200 times as large as a weight of said second sheet.

6. The balloon according to claim 5, wherein said second sheet is formed of a polymer fiber.

* * * * *